(12) United States Patent
Radhakrishnan et al.

(10) Patent No.: US 11,269,728 B2
(45) Date of Patent: Mar. 8, 2022

(54) SCALABLE MULTI-FRAMEWORK MULTI-TENANT LIFECYCLE MANAGEMENT OF DEEP LEARNING APPLICATIONS

(71) Applicant: International Business Machines Corporation, Armonk, NY (US)

(72) Inventors: Jayaram Kallapalayam Radhakrishnan, Yorktown Heights, NY (US); Vinod Muthusamy, Austin, TX (US); Vatche Isahagian, Yorktown Heights, NY (US); Scott Boag, Cambridge, MA (US); Benjamin Herta, Yorktown Heights, NY (US); Atin Sood, Yorktown Heights, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 80 days.

(21) Appl. No.: 16/358,890

(22) Filed: Mar. 20, 2019

(65) Prior Publication Data
US 2020/0301782 A1    Sep. 24, 2020

(51) Int. Cl.
*G06F 11/14* (2006.01)
*G06N 20/00* (2019.01)

(52) U.S. Cl.
CPC ......... *G06F 11/1415* (2013.01); *G06N 20/00* (2019.01); *G06F 2201/86* (2013.01)

(58) Field of Classification Search
CPC .. G06F 11/1415; G06F 2201/86; G06N 20/00
See application file for complete search history.

(56) References Cited

U.S. PATENT DOCUMENTS

| | | | |
|---|---|---|---|
| 9,336,060 B2 | 5/2016 | Nori et al. | |
| 9,860,311 B1* | 1/2018 | Rohde | G06F 9/5083 |
| 10,642,713 B1* | 5/2020 | McColgan | G06F 11/0751 |
| 2008/0049942 A1 | 2/2008 | Sprunk et al. | |
| 2016/0026253 A1 | 1/2016 | Bradski et al. | |
| 2016/0335451 A1 | 11/2016 | Sinor | |
| 2017/0052856 A1* | 2/2017 | Subbarayalu | G06F 11/2023 |
| 2017/0171020 A1* | 6/2017 | Wei | G06F 11/1441 |
| 2017/0270245 A1 | 9/2017 | Van Rooyen et al. | |

(Continued)

OTHER PUBLICATIONS

Mel, et al. "The NIST Definition of Cloud Computing". Recommendations of the National Institute of Standards and Technology. Nov. 16, 2015.

(Continued)

*Primary Examiner* — Bryce P Bonzo
*Assistant Examiner* — Michael Xu
(74) *Attorney, Agent, or Firm* — Peter Edwards, Esq.; McGinn I.P. Law Group, PLLC (57) ABSTRACT

A lifecycle management method, system, and computer program product include coordinating hardware, platform and application-level health checks for framework-independent and application-specific monitoring, failure detection, and recovery, coordinating the hardware, the platform, and the application-level health check by state-specific aggregation of distributed atomic status events, and creating a recovery policy based on the state-specific aggregation of the distributed atomic status events.

20 Claims, 10 Drawing Sheets

(56) References Cited

U.S. PATENT DOCUMENTS

| | | | |
|---|---|---|---|
| 2018/0210801 A1* | 7/2018 | Wu | G06F 11/30 |
| 2019/0065275 A1* | 2/2019 | Wong | G06F 9/5011 |
| 2020/0097653 A1 | 3/2020 | Mehta et al. | |
| 2020/0133755 A1* | 4/2020 | Bansal | G06N 20/00 |
| 2020/0159622 A1* | 5/2020 | Chintagunta | G06F 11/0769 |
| 2020/0210261 A1* | 7/2020 | Reddy | G06F 21/57 |

OTHER PUBLICATIONS

Chun, B-G. et al, "Apache REEF: Retainable Evaluator Execution Framework", Google; Oct. 2017.

Suresh, C, "Learning Model for Monitoring System Health", IP.COM, An IP.com Prior Art Database Technical Disclosure; IP.com No. IPCOM000238732D; Sep. 15, 2014.

Anonymously, "Method and System for Recovering Computer System Without Manual Intervention", IP.COM, An IP.com Prior Art Database Technical Disclosure; IP.com No. IPCOM000206905D; May 13, 2011.

United States Office Action dated May 7, 2021, in co-pending U.S. Appl. No. 16/358,896.

United States Office Action dated Apr. 2, 2021, in co-pending U.S. Appl. No. 16/358,896.

\* cited by examiner

SCALABLE MULTI-FRAMEWORK MULTI-TENANT LIFECYCLE MANAGEMENT OF DEEP LEARNING APPLICATIONS

CROSS REFERENCE TO RELATED APPLICATIONS

The present application is a related application of co-pending U.S. patent application Ser. No. 16/358,896, which is filed concurrently herewith, the entire contents of which are incorporated herein by reference.

BACKGROUND

The present invention relates generally to a lifecycle management method, and more particularly, but not by way of limitation, to a system, method, and computer program product for managing an end-to-end lifecycle of a deep learning (DL) application (job).

Deep Learning is a specific branch of machine learning which has gained popularity due to the wide availability of large-scale graphic processing unit (GM-enabled physical machines. Several open-sourced platforms (e.g., Caffe™, TensorFlow™, Torch™, etc.) are currently available that allow for the specifying and training of deep learning models. These platforms have a wide range of adoption by different data scientists and target different types of applications (e.g., speech, vision, text, etc.)

Several companies are offering a deep learning service that supports only a single platform. However, having a service that supports multiple platforms would be advantageous, because it allows the data scientist to focus on building and experimenting with training model rather than dealing with resource management, audit, and resource allocations. Similar to programming languages, each data scientist may prefer a specific deep learning platform(s), thereby making support for multiple platforms crucial.

SUMMARY

Therefore, in view of the deficiencies in the conventional techniques, the inventors have considered a lifecycle management service (LCM) that is scalable, handles the management of resources, and handles the monitoring of the complete set of states and state changes of training jobs.

In an exemplary embodiment, the present invention provides a computer-implemented lifecycle management method, the method including coordinating hardware, platform and application-level health checks for framework-independent and application-specific monitoring, failure detection, and recovery, coordinating the hardware, the platform, and the application-level health check by state-specific aggregation of distributed atomic status events, and creating a recovery policy based on the state-specific aggregation of the distributed atomic status events.

One or more other exemplary embodiments include a computer program product and a system, based on the method described above.

Other details and embodiments of the invention will be described below, so that the present contribution to the art can be better appreciated, Nonetheless, the invention is not in its application to such details, phraseology, terminology, illustrations and/or arrangements set forth in the description or shown in the drawings. Rather, the invention is capable of embodiments in addition to those described and of being practiced and carried out in various ways and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which.

DETAILED DESCRIPTION

The invention will now be described with reference to FIGS. 1-10, in which like reference numerals refer to like parts throughout. It is emphasized that, according to common practice, the various features of the drawings are not necessarily to scale. On the contrary, the dimensions of the various features can be arbitrarily expanded or reduced for clarity.

Figure 1:
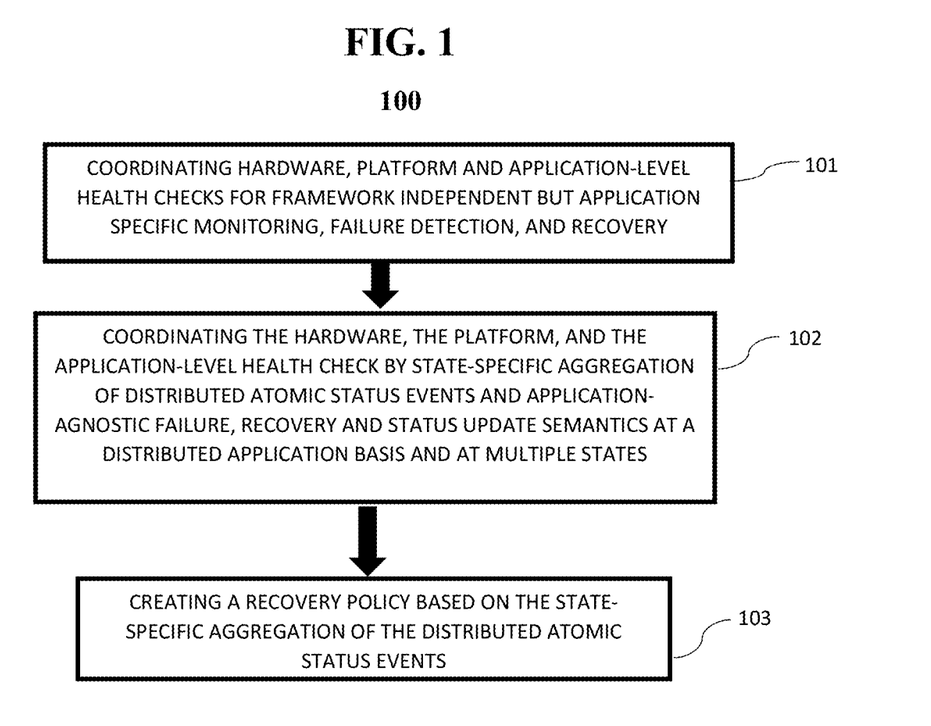
FIG. 1 exemplarily shows a high-level flow chart for a lifecycle management method 100 according to an embodiment of the present invention.

By way of introduction of the example depicted in FIG. 1, an embodiment of a lifecycle management method 100 according to the present invention can include various steps for a framework (e.g., libraries, Google®, Amazon®, IBM®, etc.) that enables application-specific monitoring, failure detection, and recovery by coordinating hardware, platform and application-level health checks. The invention includes the ability for application-agnostic (i.e., user provided) failure, recovery, and status update semantics at the distributed application basis and at multiple states.

Figure 8:
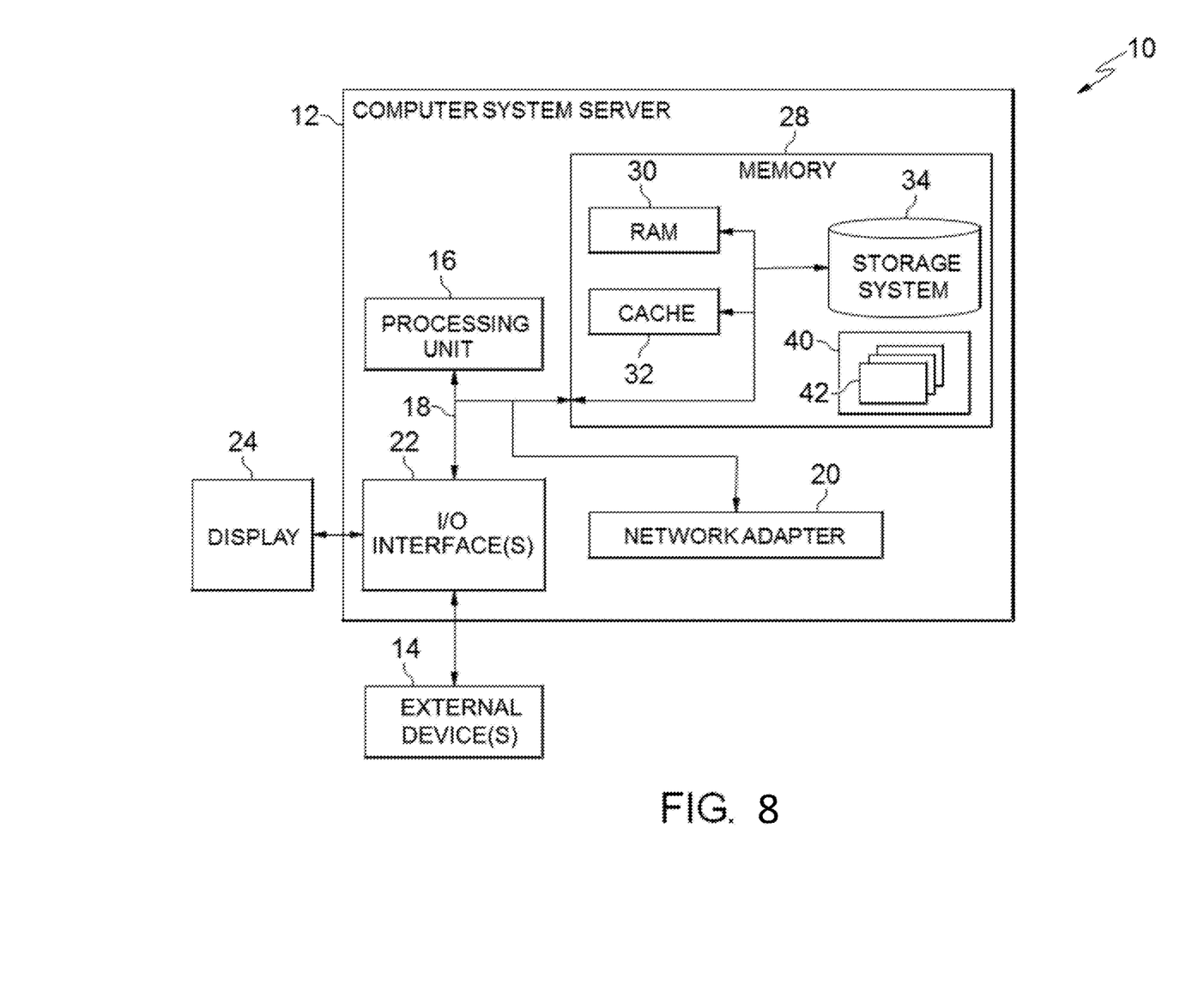
FIG. 8 depicts a cloud-computing node 10 according to an embodiment of the present invention.

By way of introduction of the example depicted in FIG. 8, one or more computers of a computer system 12 according to an embodiment of the present invention can include a memory 28 having instructions stored in a storage system to perform the steps of FIG. 1.

Although one or more embodiments may be implemented in a cloud environment 50 (e.g., FIG. 10), it is nonetheless understood that the present invention can be implemented outside of the cloud environment.

For example, FIGS. 3-6, describe the invention in the context of a "Deep Learning as-a-Service (DLaaS)" software system, in which data scientists submit deep learning jobs to be executed in a cloud-based platform hosted by an organization. DLaaS is a cloud-native application architected as a set of loosely-coupled microservices communicating with each other using gRPC (remote proactive call). Logically, DLaaS has three layers including (1) a Lifecycle Manager (LCM) microservice; (2) the Platform layer comprising the infrastructure that the core services rely on including a Containerization and Container Image management system (e.g., Docker), a Cluster Manager (e.g., Kubernetes), a coordination service (e.g., ETCD); and (3) Helpers, which are components that are spawned as part of the DL job during execution. Helpers perform failure detection, status recording and updates, log collection, data and results transfer, and metrics collection.

With reference to FIGS. 3-6, deep learning (DL) jobs are submitted through an Applicant Programming Interface (API) layer, which may be a separate microservice. The specifics of the API layer (e.g., whether it is based on gRPC or REST, etc.) are not germane to this invention. For the lifetime of a DL job, all its metadata, including its job parameters, are stored in some database for record keeping (again, the specifics of which are not germane to this invention). This also ensures that submitted jobs are never lost. The job arrives at the Lifecycle Manager (LCM) microservice. The LCM is responsible for the job from submission to completion or failure. This includes deployment, monitoring, garbage collection, and user-initiated termination of the job. Deploying a DL job is a multi-step process, involving placement on an appropriate cluster node with available GPUs, setting up network (e.g., message passing interface (MPI)) interconnections, and provisioning shared volumes and credentials to access data. Users require that provisioning of DL jobs be atomic, either the whole job is provisioned with the requisite resources or none.

With reference to FIGS. 3-6, the LCM then executes the multi-step process of actually deploying the DL job by further interacting with K8s (e.g., kubernetes). Some of the key steps in this workflow are instantiating Docker containers (corresponding to the DL framework used such as Tensorflow® or PyTorch™) with training parameters and user code, setting up shared network file system (NFS) volumes to monitor training progress, and applying cluster manager policies to restrict network access from the learner in a multi-tenant environment. If the LCM crashes in the middle of a job deployment, then the cluster manager is typically (e.g., in the case of Kubernetes) guaranteed to restart it. The restarted LCM will "roll back" the previous partially deployed DL job, and starts a fresh deployment process. In the presence of persistent failures, this process will be repeated for a (e.g., configurable) number of times before the LCM gives up and marks the DL job in the job database as FAILED. Once a DL job is successfully deployed, the LCM is then responsible for monitoring its progress.

Figure 4:
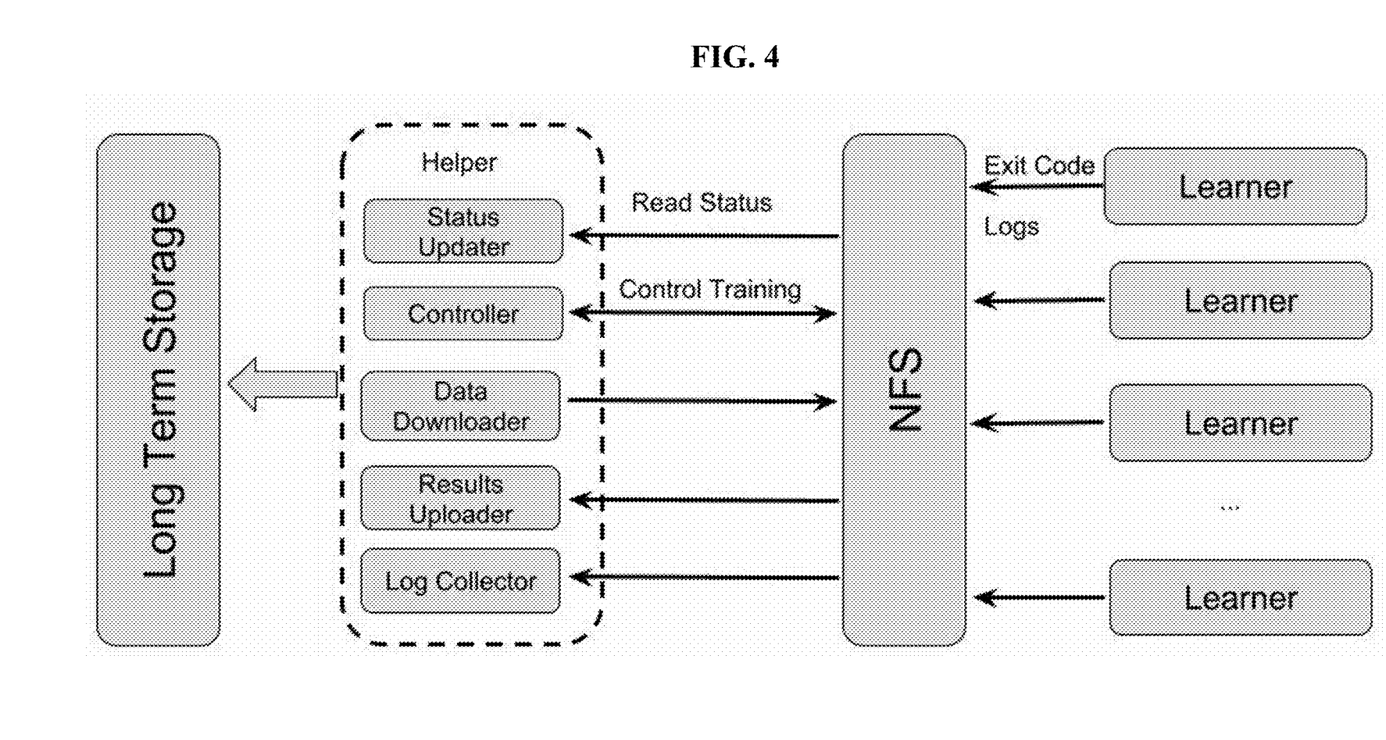
FIG. 4 exemplarily depicts an implementation of the method 100 using a helper according to an embodiment of the present invention.
Figure 5:
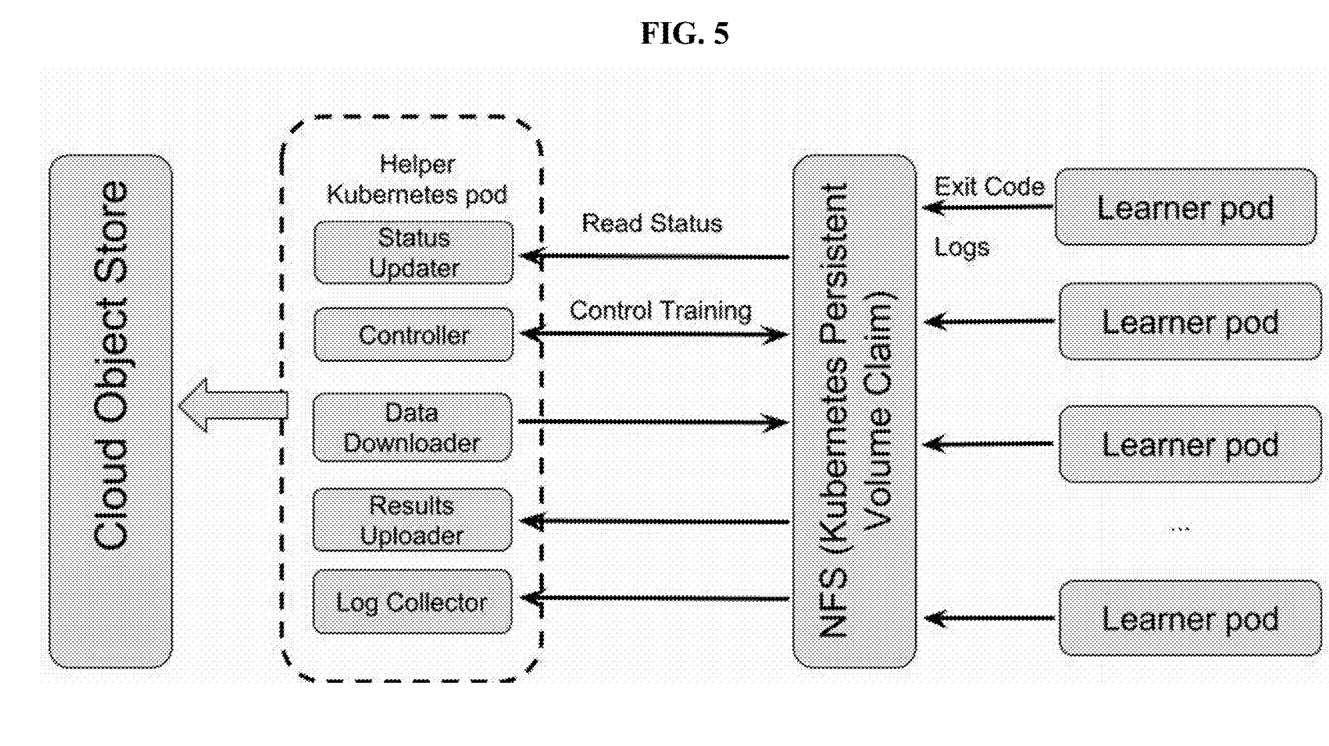
FIG. 5 exemplarily depicts an implementation of the method 100 using a helper in kubernetes according to an embodiment of the present invention.
Figure 6:
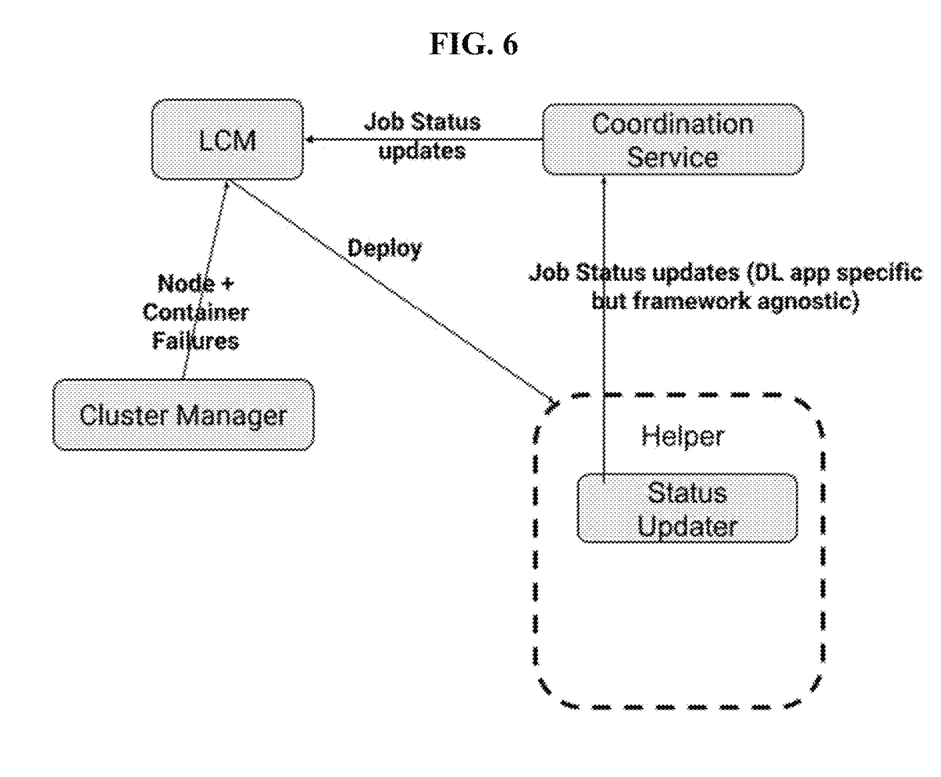
FIG. 6 exemplarily depicts an implementation of the method 100 in an integrated view according to an embodiment of the present invention.
Figure 7:
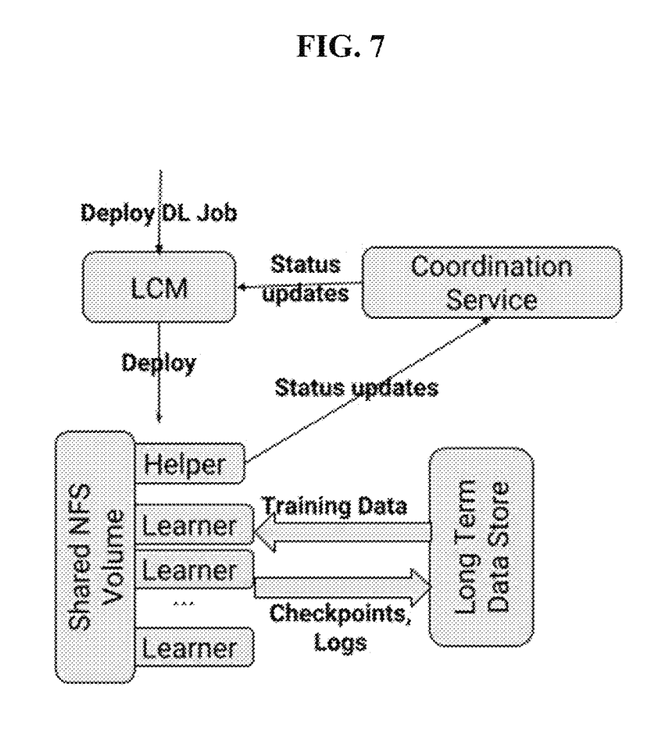
FIG. 7 exemplarily depicts an implementation of the method 200 in an integrated view according to an embodiment of the present invention.

With reference to FIGS. 4 and 5, the LCM uses cluster manager abstractions (e.g., Kubernetes stateful sets) to deploy a DL Job. This enables the LCM to create replicated learners (e.g., for distributed training) and is well-suited for commonly-available DL frameworks (e.g., like Horovod™ and distributed Tensorflow™). For each DL job, the LCM also creates a separate Helper using the appropriate cluster manager abstraction (e.g., Kubernetes Deployment abstraction), which contains a number of containers: Load-data and Store-results to load and store data, Log-collector to process logs, and controller to orchestrate the job. The "helper" remains isolated from the "learners", but both share a common NFS filesystem, mounted by the LCM using an appropriate cluster manager abstraction (e.g., a Kubernetes persistent volume claim).

With reference to FIGS. 4-7, the shared NFS volume enables the controller container running separately in the helper pod to monitor the execution and exit status of the learner processes and detect both learner process completion and failures by reading their output and process exit status which are redirected to a file.

With reference to FIGS. 4-7, in addition to detecting completion and failure, the controller can read the status/output of the load-data and store-results containers because all the helper and learner containers share a common NFS file system. To reduce coupling between components in the invention, and ensure reliable status updates, the inventors employ a distributed coordination service (e.g., the ETCD key-value store to coordinate between the controller and LCM). The coordination service (e.g., ETCD) itself is replicated (e.g., 3-way), and uses a distributed consensus protocol (e.g., the Raft consensus protocol) to ensure atomicity, isolation, durability and consistency. The controller records the current status of each learner in the coordination service, where it is read by the LCM. In the case of a DL job, these states can be, for example, "DOWNLOADING", "PROCESSING", "CHECKPOINTING", "RECOVERING FROM CHECKPOINT", "STORING TRAINED MODEL", "COMPLETED", "FAILED", "HALTED BY USER". Such states are DL or application framework independent (i.e., apply to e.g., Spark™ or Tensorflow™ or Caffe™) but application-specific (specific to DL training applications). The invention thus enables the monitoring of multiple application states without necessarily changing application code.

With reference to FIGS. 4-7, situations where an application process (e.g., a learner) fails, i.e., by writing an appropriate exit code to NFS, can be detected by the controller. However, application crashes (e.g., a DL job crash) due to node/container crashes or operating system crashes are detected by the cluster manager and communicated to the LCM. Crashed application containers (e.g., learners) will typically be restarted automatically by the cluster manager (e.g., Kubernetes), because they are deployed using appropriate cluster manager abstractions (e.g., Kubernetes stateful sets). In the case of a DL job, a recovered learner can continue training either (1) from the latest checkpoint, or (2) in the ease of distributed DL jobs, by rejoining other learners and getting the latest neural net parameters from a parameter server (e.g., if the DL framework supports this). The work lost due to a crash is determined by the checkpointing interval.

With reference to FIGS. 4-7, using a coordination service makes status updates resilient to crashes of both the controller/helper and crashes of the LCM. Using NFS makes status updates resilient to controller crashes; the cluster manager will restart the controller which can read current status and previous statuses from NFS.

With reference to FIGS. 4-7, the LCM may be replicated for fault tolerance. Since most job state(s) is externalized either in the coordination service or the NFS, LCM is effectively stateless. This enables it to be replicated easily.

With reference to FIGS. 4-7, the LCM performs some of its aforementioned functions directly, but may create "delegates" for others, both for scalability as well as to avoid becoming a single point of failure. To deploy a DL job, the LCM simply instantiates a lightweight delegate called the "Guardian" with all the metadata of the DL job. The Guardian is created on the fly.

With reference to FIG. 1, in step 101, hardware, platform and application-level health checks are coordinated by the LCM for framework-independent but application-specific monitoring, failure detection, and recovery. For example, in the ease of a DL job, the job status may be the aggregation of the states of all its learning processes. A DL job may be said to be in "DOWNLOADING" state if all its learners are either in a "DOWNLOADING" state or one of the learners is in a state that comes after "DOWNLOADING". The LCM performs such aggregation. However, a DL job may be in a "FAILED" state if at least one of its learners fails, irrespective of the states of the other learners.

In step 102, the hardware, the platform, and the application-level health checks are coordinated by state-specific aggregation of distributed atomic status events. In one embodiment, the hardware, the platform, and the application-level health checks can be further coordinated by application-agnostic failure, recovery and status update semantics at a distributed application basis and at multiple states.

In step 103, a recovery policy is created based on the state-specific aggregation of the distributed atomic status events. Recovery from failures may be different, based on the type of failure. A failure of a DL job due to hardware or operating system or container failures may be slated for recovery, but a failure due to errors in the DL job code might not be. Such policies can vary by application, and the lifecycle manager in the invention coordinates hardware, platform and application-level health checks as described in the preceding paragraphs.

In one embodiment, the application-specific monitoring, failure detection, and recovery occurs at a datacenter level and/or cloud operating environment level such that failures are either correlated or independent. And, the platform and hardware-level health checks are agnostic to application.

In method 100, the failure detection, the recovery, and the status update semantics are specified by the application. Moreover, the distributed atomic status events are different layers of the application stack, and from different workers in a distributed application. And, the state-specific aggregation of the distributed atomic status events is specific to each state, and a history of state transitions.

Figure 2:
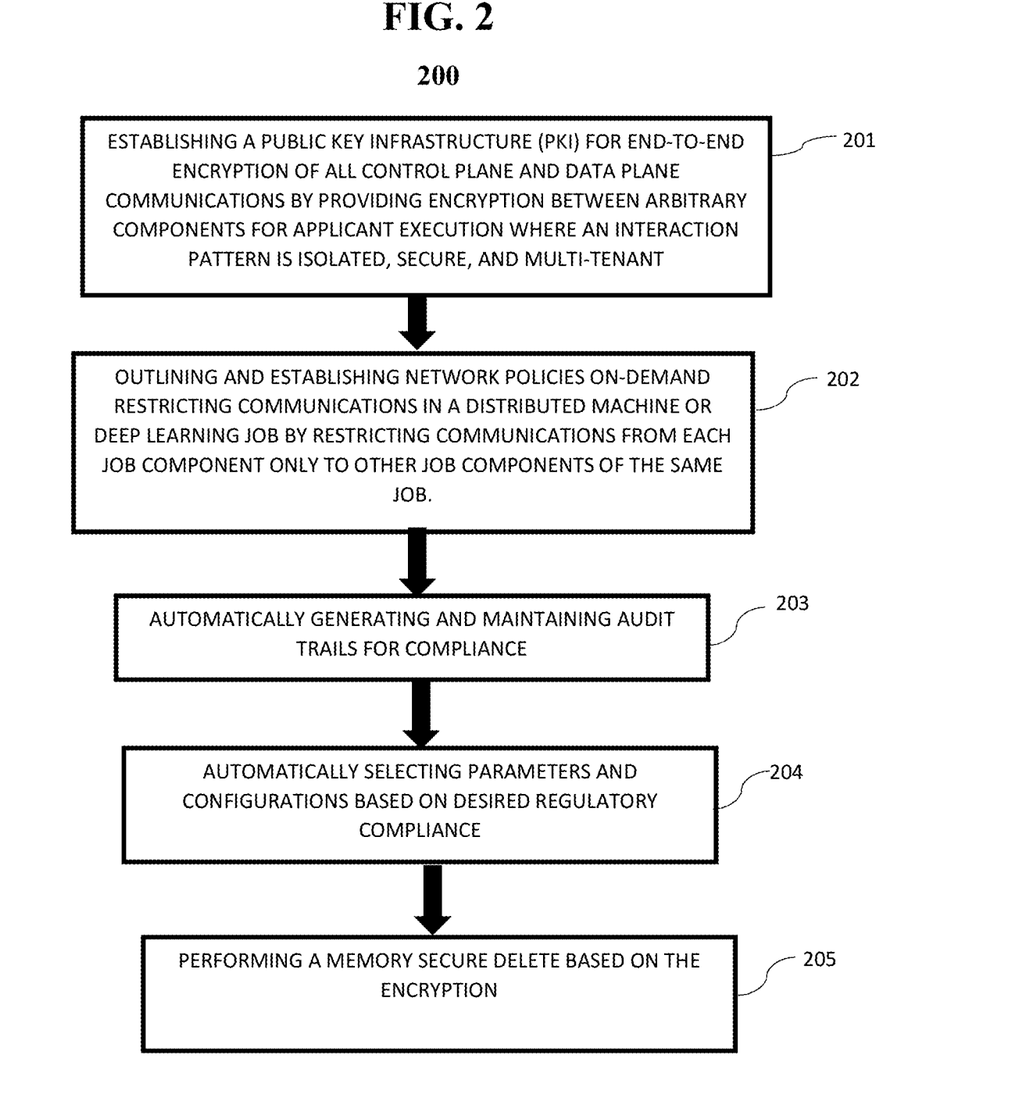
FIG. 2 exemplarily depicts a high-level flow chart for a lifecycle management method 200 according to an embodiment of the present invention.
Figure 3:
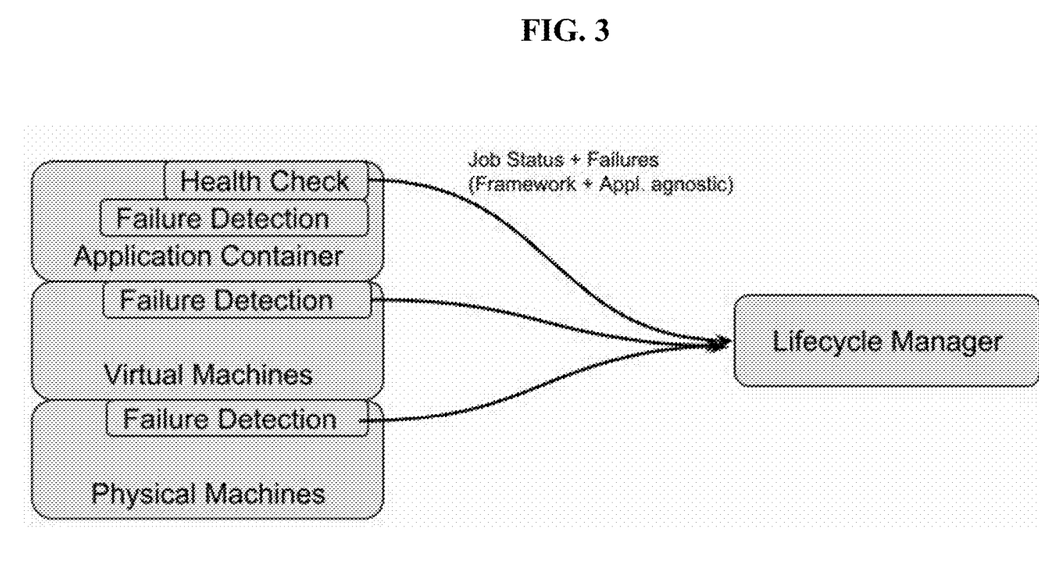
FIG. 3 exemplarily depicts integrating health checks at various levels in a software stack executing on a server in a datacenter/cloud environment according to an embodiment of the present invention.

With reference to FIG. 2, in step 201 a public key infrastructure (PKI) is dynamically established for end-to-end encryption of all control plane and data plane communications by providing encryption between arbitrary components for application execution (e.g., where an interaction pattern is specified between application components) to ensure isolated and secure execution in a multi-tenant environment. This involves generating public key/private key pairs for each components of the application that is part of the interaction pattern, and distributing these keys to each participant. It further involves using a cluster-level trusted third party or a cluster-level certificate authority to digitally sign and distribute the public key of each component to every other component. Messages from component C1 to component C2 can be encrypted in the following manner: A message from C1 to C2 (e.g., possibly with timestamps or nonces) is encrypted by C1 first with the private key of C1 and the ciphertext is encrypted by C1 with the public key of C2.

In step 202, network policies restricting all communications in a distributed deep learning job to support isolated and secure execution in a multi-tenant environment are outlined. It is noted that a multi-tenant environment is one in which each tenant can be separate from each other. For example, one could have an organization providing deep learning (DL) as a service to its customers. Each customer is a tenant, and the DL platform hosted on the organization's datacenters and shared by its customers is "multi-tenant". Needless to say, jobs from customer C1 should not be able to access or interfere with jobs from customer C2. This could also apply to a single organization and departments D1 and D2 within the organization dealing with different clients. To achieve isolation, the inventive mechanism dynamically adds network policies using software defined networking (SDN) infrastructure to the compute cluster executing deep learning jobs. Typically one policy is specified per job. Such policies restrict communication from components of Job J1 to other components of J1 only. That is, a "learning process" ("learner") of J1 may communicate with another learner or parameter server of J1, but not with a learner of J2. Learners are part of jobs submitted by customers, and a malicious customer may submit malicious code as part of a learner. The inventive network policies prevent such malicious code from interacting with or causing harm to legitimate customers and users, even if the malicious customer goes undetected.

In step 203, audit trails for regulatory compliance are automatically generated and maintained. This includes, but not limited to, all events pertaining to the job from submission to completion/failure. Further, the information may include the customer who submitted it, information about the job, where the job was deployed and how long it executed for, the fact that encryption and network policies were set up and configured, and all health check events that occurred during the execution of the job, New items can be added or items removed based on desired compliance level—whether it be associated with or based on Health Insurance Privacy and Accountability Act (HIPAA) or the cloud computing guidelines for federal contracts (FedRAMP).

In step 204, parameters and configurations are selected (e.g., automatically) based on desired regulatory compliance requirements. For example, if the application needs to be HIPAA compliant, parameters and configurations for encryption would be selected based on NIST's Federal Information Processing Standards (FIPS). In this case, only Advanced Encryption Standard (AES) or Triple DES would be chosen as encryption algorithms. The lifecycle manager (LCM) described in this invention stores a list of common regulations and their corresponding parameters and configurations, and may enable the addition of new regulations in the form of an LCM configuration or manifest file.

In step 205, a memory secure delete is performed based on established NIST standards, Typically, this involves either zeroing-out data (e.g., overwriting the data with 0) or by using secure cryptographic erase if data at rest is already encrypted (e.g., where the keys are zeroed out but the ciphertext that represents encrypted data is left as is).

Thereby, methods 100 and 200 provide for a technique to manage the end-to-end lifecycle of a deep learning application (e.g., job) which is flexible and supports multiple deep learning frameworks, and consequently multiple deep learning application programming models, scalable, with respect to the number of concurrently running applications, and the size of the compute cluster that runs these applications, multi-tenant, supporting multiple users and administrative domains with strong isolation and fairness guarantees, and fault-Tolerant.

It is noted that with the invention, the lifecycle monitoring is not specific to failures but can check the health of all states including failures.

Exemplary Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (Paas): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 8, a schematic of an example of a cloud computing node is shown. Cloud computing node 10 is only one example of a suitable node and is not intended to suggest any limitation as to the scope of use or functionality of embodiments of the invention described herein. Regardless, cloud computing node 10 is capable of being implemented and/or performing any of the functionality set forth herein.

Although cloud computing node 10 is depicted as a computer system server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

Referring now to FIG. 8, a computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of a f several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further described below, memory 28 may include a computer program product storing one or program modules 42 comprising computer readable instructions configured to carry out one or more features of the present invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may be adapted for implementation in a networking environment. In some embodiments, program modules 42 are adapted to generally carry out one or more functions and/or methodologies of the present invention.

Computer system/server 12 may also communicate with one or more external devices 14 such as a keyboard, a pointing circuit, other peripherals, such as display 24, etc., and one or more components that facilitate interaction with computer system/server 12. Such communication can occur via Input/Output (I/O) interface 22, and/or any circuits (e.g., network card, modem, etc.) that enable computer system/server 12 to communicate with one or more other computing circuits. For example, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 9:
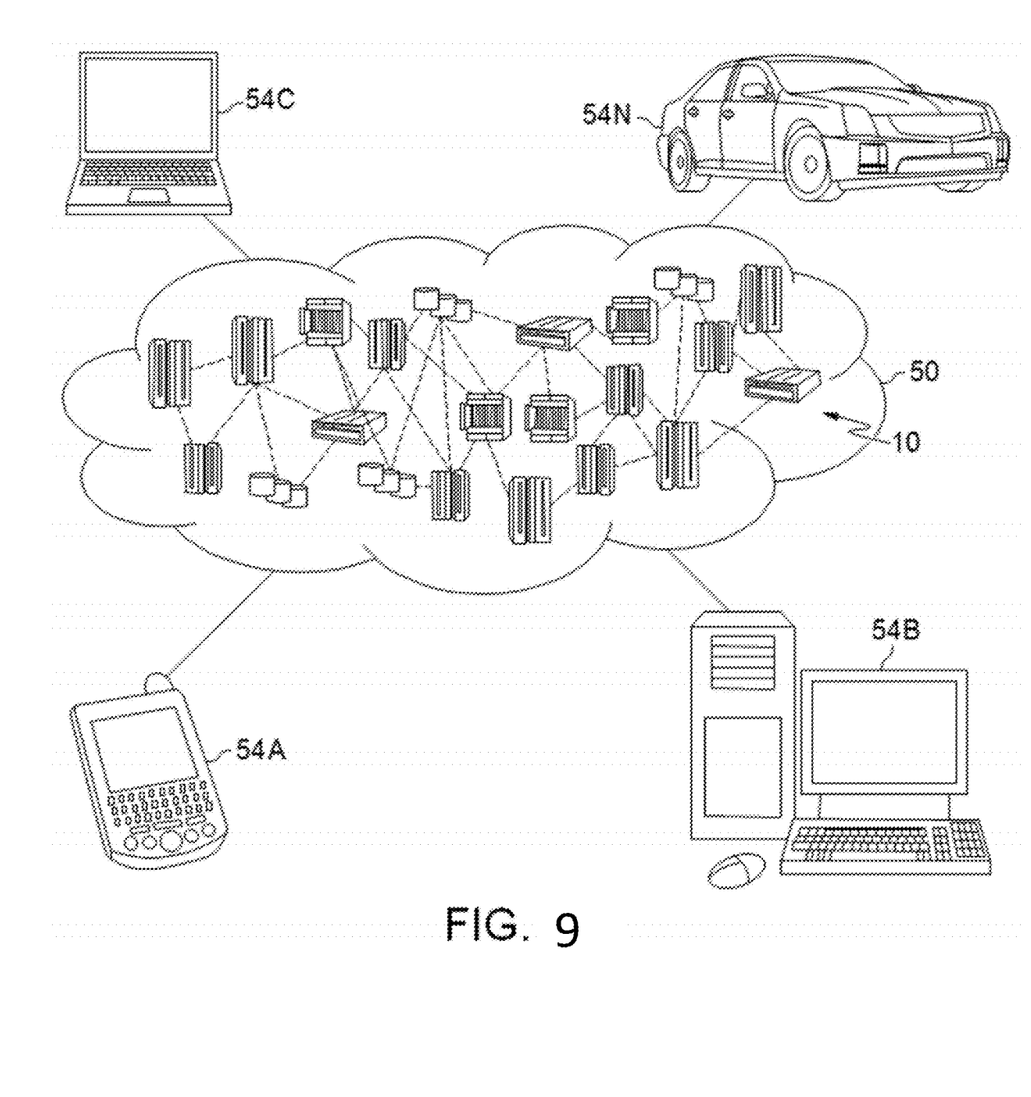
FIG. 9 depicts a cloud-computing environment 50 according to an embodiment of the present invention.

Referring now to FIG. 9, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another, They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 9 are intended to be illustrative only and that computing nodes 10 and cloud computing environment 50 can communicate with any type of computerized circuit over any type of network and/or network addressable connection (e.g., using a web browser).

Figure 10:
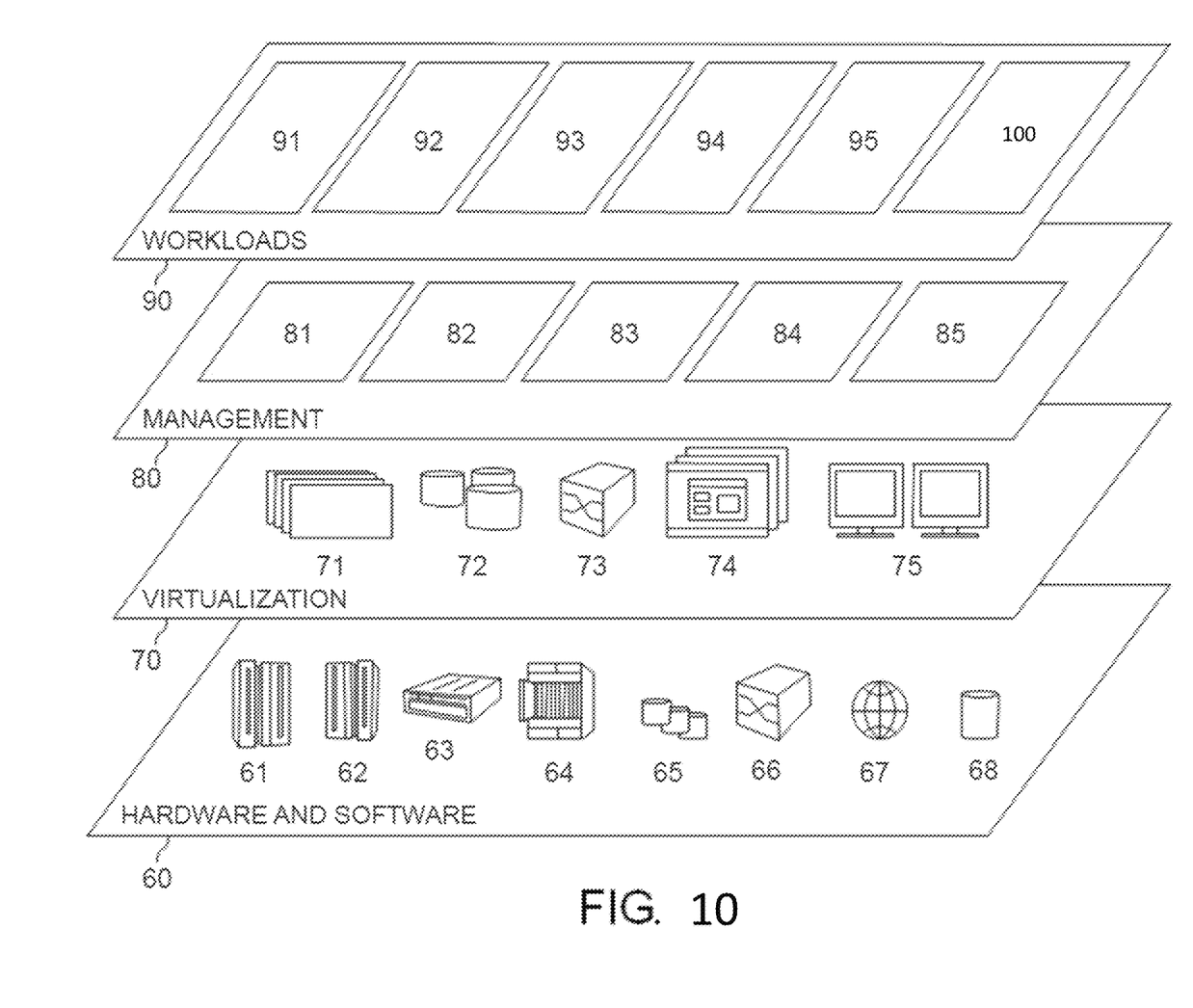
FIG. 10 depicts abstraction model layers according to an embodiment of the present invention.

Referring now to FIG. 10, an exemplary set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment, Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met, Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and lifecycle management method 100 in accordance with the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers, A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent s to encompass the equivalents of all claim elements, and no amendment to any claim of the present application should be construed as a disclaimer of any interest in or right to an equivalent of any element or feature of the amended claim.

What is claimed is:

1. A computer-implemented lifecycle management method, the method comprising:
    coordinating hardware, platform and application-level health checks for framework-independent and application-specific monitoring, failure detection that is provided, and recovery;
    coordinating the hardware, the platform, and the application-level health checks by state-specific aggregation of distributed atomic status events; and
    creating a recovery policy based on the state-specific aggregation of the distributed atomic status events, the recovery policy being different for each type of failure in the failure detection including not slating an application of the application-specific monitoring for recovery.

2. The method of claim 1, wherein the application-specific monitoring, failure detection, and recovery occurs at a datacenter level and/or cloud operating environment level such that failures are either correlated or independent.

3. The method of claim 1, wherein the application-specific monitoring, failure detection, and recovery occurs at a datacenter level and/or cloud operating environment level such that failures are independent.

4. The method of claim 1, wherein the application-specific monitoring, failure detection, and recovery occurs at a datacenter level and/or cloud operating environment level such that failures are correlated.

5. The method of claim 1, wherein the platform and hardware-level health checks are agnostic to the application.

6. The method of claim 1, wherein the failure detection, the recovery, and the status update semantics are specified by the application.

7. The method of claim 1, wherein the distributed atomic status events comprise different layers of the application stack, and from different workers in a distributed application.

8. The method of claim 1, wherein the state-specific aggregation of the distributed atomic status events is specific to each state, and a history of state transitions.

9. The method of claim 1, embodied in a cloud-computing environment.

10. A computer program product for lifecycle management, the computer program product comprising a computer-readable storage medium having program instructions embodied therewith, the program instructions executable by a computer to cause the computer to perform:
    coordinating hardware, platform and application-level health checks for framework-independent and application-specific monitoring, failure detection that is provided, and recovery;
    coordinating the hardware, the platform, and the application-level health checks by state-specific aggregation of distributed atomic status events; and
    creating a recovery policy based on the state-specific aggregation of the distributed atomic status events, the recovery policy being different for each type of failure in the failure detection including not slating an application of the application-specific monitoring for recovery.

11. The computer program product of claim 10, wherein the application-specific monitoring, failure detection, and recovery occurs at a datacenter level and/or cloud operating environment level such that failures are either correlated or independent.

12. The computer program product of claim 10, wherein the application-specific monitoring, failure detection, and recovery occurs at a datacenter level and/or cloud operating environment level such that failures are independent.

13. The computer program product of claim 10, wherein the application-specific monitoring, failure detection, and recovery occurs at a datacenter level and/or cloud operating environment level such that failures are correlated.

14. The computer program product of claim 10, wherein the platform and hardware-level health checks are agnostic to the application.

15. The computer program product of claim 10, wherein the failure detection, the recovery, and the status update semantics are specified by the application.

16. The computer program product of claim 10, wherein the distributed atomic status events comprise different layers of the application stack, and from different workers in a distributed application.

17. A lifecycle management system, the system comprising:
    a processor; and
    a memory, the memory storing instructions to cause the processor to perform:
        coordinating hardware, platform and application-level health checks for framework-independent and application-specific monitoring, failure detection that is provided, and recovery;
        coordinating the hardware, the platform, and the application-level health checks by state-specific aggregation of distributed atomic status events; and
        creating a recovery policy based on the state-specific aggregation of the distributed atomic status events, wherein the coordinating further coordinates the hardware, the platform, and the application-level health checks by application-agnostic failure, recovery and status update semantics on a distributed application basis and at multiple states, wherein a helper provides the status update and is isolated from a learner, and wherein the helper and the learner share a common file system.

18. The system of claim 17, embodied in a cloud-computing environment.

19. The method of claim 1, wherein a helper provides status update semantics on a distributed application basis and is isolated from a learner, and wherein the helper and the learner share a common file system.

20. The method of claim 1, work lost due to a crash as detected by the failure detection is determined via a checkpointing interval.

\* \* \* \* \*